United States Patent [19]

Rzepczynski

[11] Patent Number: 4,866,412

[45] Date of Patent: Sep. 12, 1989

[54] TACTILE SENSOR DEVICE

[75] Inventor: Zenon G. Rzepczynski, Tyne & Wear, England

[73] Assignee: The Microelectronics Applications Research Institute Limited, Newcastle Upon Tyne, England

[21] Appl. No.: 84,306

[22] Filed: Aug. 11, 1987

[30] Foreign Application Priority Data

Aug. 14, 1986 [GB] United Kingdom ............... 8619800

[51] Int. Cl.$^4$ ............................................ H01C 10/10
[52] U.S. Cl. ...................................... 338/114; 338/99
[58] Field of Search ................... 338/114, 99, 47, 112, 338/115, 95

[56] References Cited

U.S. PATENT DOCUMENTS

| | | | |
|---|---|---|---|
| 4,357,266 | 11/1982 | Sado et al. | 338/114 X |
| 4,734,034 | 3/1988 | Maness et al. | 338/99 X |
| 4,738,146 | 4/1988 | Baumgartney et al. | 338/114 X |

FOREIGN PATENT DOCUMENTS

| | | | |
|---|---|---|---|
| EP0161895 | 11/1986 | European Pat. Off. | |
| 1557588 | 12/1979 | United Kingdom | 338/99 |
| 2046540 | 11/1980 | United Kingdom | |
| 2077508 | 12/1981 | United Kingdom | 338/99 |
| 2115555 | 9/1983 | United Kingdom | |
| 2115556 | 9/1983 | United Kingdom | |
| 8701574 | 3/1987 | World Int. Prop. O. | |

Primary Examiner—E. A. Goldberg
Assistant Examiner—M. M. Lateef
Attorney, Agent, or Firm—Henry Sternberg; Bert J. Lewen

[57] ABSTRACT

A tactile sensor device, of value in a sensor system for identifying an object by contact, in the form of a first array of parallel elongated lengths of electroconductive material, a second array of parallel elongated lengths of electroconductive material, disposed transverse to the first array so that lengths in the two arrays intersect, and a resilient piezoresistive material disposed in continuous contact with the lengths of electroconductive material in one of the arrays and located between the arrays.

7 Claims, 2 Drawing Sheets

TACTILE SENSOR DEVICE

The present invention is a tactile sensor device such as may be used as part of a sensor system by means of which an object may be identified or selected from among a collection of objects.

In efforts to develop robots aimed at simulating human activities, in particular production activities in manufacturing industry, a highly desirable feature yet to be satisfactorily developed is that of recognising characteristics of an object by touch. In particular, while sensor pads have been developed experimentally which are intended to simulate, at least to some extent, the tactile recognition characteristics of the human finger tip, the degree of definition achieved by existing such pads leaves much room for improvement. For example, while sensor pads based upon detecting changes in the resistance of piezoresistive material are already known, the tactile images produced by such pads are usually somewhat diffuse and indefinite.

Against this background, it is an object of the present invention to provide an improved tactile sensor device, which is capable of yielding images of improved definition.

The tactile sensor device according to the present invention comprises a first array of parallel elongated lengths of electroconductive material, a second array of parallel elongated lengths of electroconductive material which is disposed transverse to said first array so that lengths in the two arrays intersect, and a resilient piezoresistive material, disposed in continuous contact with the lengths of electroconductive material in one of said arrays and located between the arrays.

The lengths of electroconductive material in each array thereof may be of any desired cross-section and may, for example, be in the form of wires or flat strips. Since, however, enhanced piezoelectrical signals are achievable when lateral distortion of the piezoresistive material is able to increase the contact area between that material and the conductive material, it is much preferred that at least one of the arrays should comprise parallel flat strips of electroconductive material.

To achieve the aforesaid benefit, it is particularly preferred that at least one of the arrays be in the form of a printed circuit board (a "PCB"), that is of thin parallel strips of a conductive material such as tinned copper, which may be produced by etching from a continuous sheet of the material, upon a non-conductive substrate. While many conventional PCB's are formed on flat, rigid substrates the arrays in the present invention need not take that form. Thus at least one of the arrays may be a flexible PCB, giving a sensor device which may itself be flexible. THe PCB, whether rigid or flexible, may be flat or may have any other desired shape, for example curved or even cylindrical in a manner broadly resembling the human finger.

The electroconductive material may thus be a metal, for example copper in wire or strip form or steel wire, but electroconductive non-metallic materials are also suitable for the lengths of material in one or both of the arrays. For example the lengths in at least one of the arrays may take the form of strips of electroconductive rubber. While the resistivity of such a rubber may be several orders of magnitude higher than that of, say, copper, it is still much more conductive than, for example, the piezoresistive material and, compared with a metal, has the advantage of greater flexibility and resilience. The relatively high conductivity of such rubbers is usually achieved by incorporating elemental carbon in their structure.

Between the two arrays of the lengths of conductive material is disposed a resilient piezoresistive material. That material is in contact with the conductive material in one of the arrays continuously down the lengths of the conductive material. Thus, for example, the piezoresistive material may take the form of a plurality of parallel discrete lengths thereof each disposed in contact with a length of conductive material in one of the arrays. These discrete lengths of resilient piezoresistive material may be flat strips, disposed beneath the individual lengths of conductive material. However, in one preferred form of the invention, the lengths of conductive material in at least one of the arrays are individually encased in piezoresistive material. In particular, the conductive material may be in the form of parallel wires individually contained in tubes of piezoresistive material.

The piezoresistive material may alternatively take the form of a continuous sheet disposed between the two arrays of lengths of conductive material. In a second alternative preferred form of the present invention, the piezoresistive material in sheet form is bonded to a sheet of a nonconductive material, sandwiched between the two sheets. This structure is particularly advantageous when the conductive material is an electroconductive rubber.

The two arrays may intersect at angles other than right angles but it is particularly preferred that they should intersect at right angles.

Thus one preferred embodiment of the tactile sensor device according to the present invention comprises an array of parallel flat strips of electroconductive material, intersected at right angles by an array of parallel tubes of piezoresistive material, each of which tubes has axially therein a wire of electroconductive material.

An alternative preferred embodiment of the tactile sensor device according to the present invention comprises a non-electroconductive rubber backing in sheet form, an array of parallel lengths of an electroconductive rubber superimposed on the backing, a sheet of a resilient piezoresistive material disposed over and in contact with said array, and a second array comprising parallel lengths of a metallic electroconductive material, disposed over and in contact with said piezoelectric material with the two said arrays intersection each other at right angles.

Any resilient piezoresistive material may be used in the device according to the present invention although, of course, the performance of the device is dependent upon the characteristics of the material selected. Thus the material may be chosen with the desired application of the device and with the desired sensitivity in mind. A particularly suitable material may be selected from the available range of piezoresistive silicone rubbers, of which the electrical properties are dependent upon the incorporation of a carbon filling therein. Among such materials, a fluorocarbon elastomer sold by E.I. du Pont de Nemours & Co. under the trade mark VITON has proved to be particularly suitable.

It is advantageous to protect the tactile sensor device of the present invention from wear and other forms of damage by coating an otherwise exposed contact surface with a suitable material, in particular a non-electroconductive material. More specifically, when one of the arrays is in the form of tubes as mentioned above or in the form of strips of electroconductive rubber, the tubes or strips may be held in parallel spaced relationship by a sheet of non-electroconductive material. A suitable material for this purpose is a non-conductive silicone rubber. Among such rubbers, a product sold by the company BDH under the trade mark SILATIC 734 RTV has proved to be highly suitable for this purpose.

The device according to the invention functions by responding to changes in resistance occurring in the piezoresistive material at the points where the material is sandwiched between intersecting lengths of conductive material. When the sensor makes physical contact with any object, one or more such points of intersection are compressed by the contact and resistance of the electrical path from one conductor to the intersecting one is modified, both by a shortening of that path and by a change in the area of contact between the respective materials. By scanning the points of contact systematically and in turn, a pattern may be built up of the area of contact of the sensor with the object in question, so as to yield an image of the object concerned. Signals arising from the scanning may be processed to yield an enhanced image if desired.

The invention will now be further described with reference to the accompanying drawings, wherein.

Figure 1:
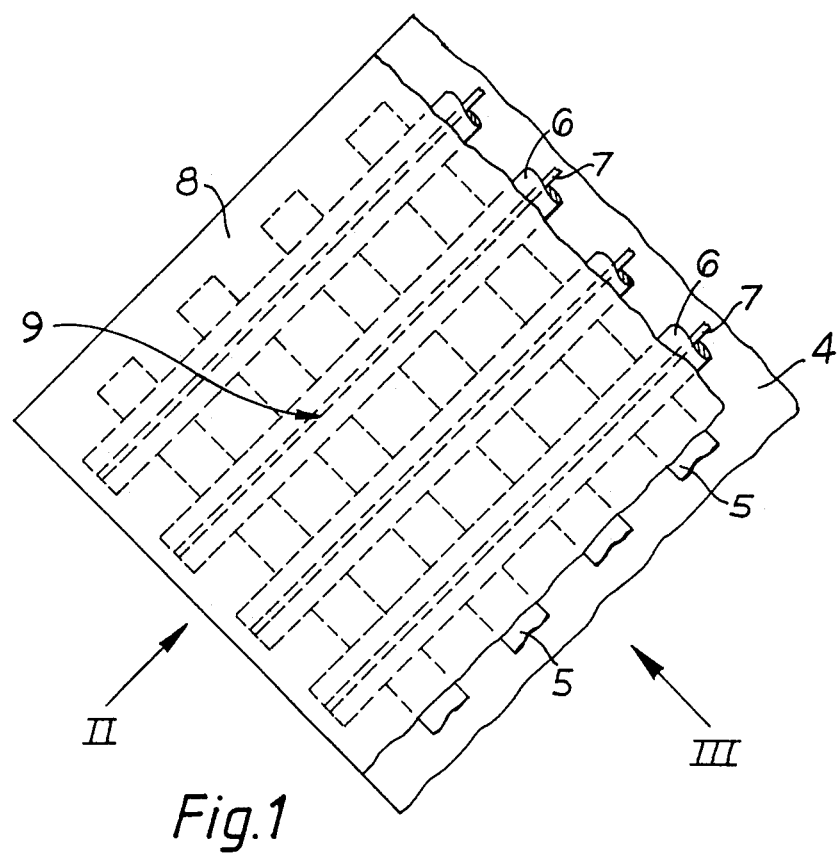
FIG. 1 is a fragmentary perspective view to a greatly enlarged scale of a first embodiment of the tactile sensor device according to the present invention.
Figure 2:
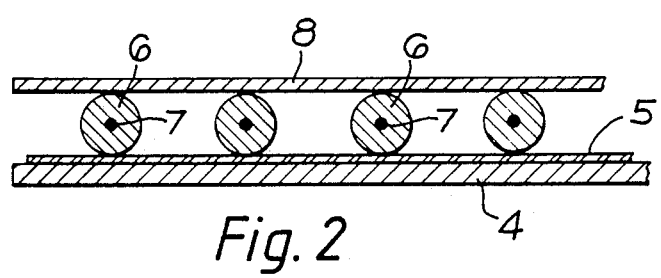
FIG. 2 is a sectional view in the direction of the arrow II of FIG. 1.
Figure 3:
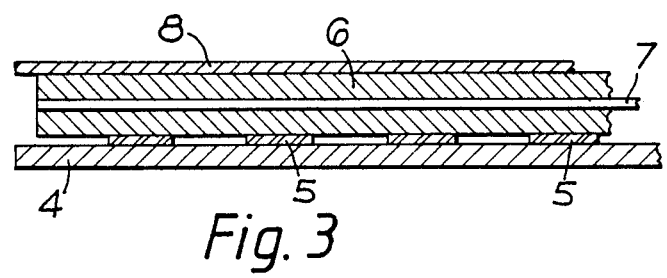
FIG. 3 is a sectional view in the direction of the arrow III of FIG. 1.

Referring firstly to FIGS. 1 to 3 of the drawings, the device illustrated therein comprises a printed circuit board having, a non-conducting substrate 4, parallel conductive strips 5 of tinned copper. Superimposed on the PCB and in contact with the copper strips are a number of tubes 6 of VITON elastomer, each enclosing a copper wire 7 running axially down its length and thereby forming a rounded covering for the wire. Bonded to the tubes 6 so as to provide a measure of protection to the tubes and also serving both to hold the tubes 6 in their spaced relationship and to insulate them electrically from their surroundings is a thin skin 8 of SILASTIC 734 RTV silicone rubber.

This device serves as a sensor pad for detecting the shape of an object placed in contact with the surface of the skin 8. Thus if, for example, the object is in contact with the skin at a point lying over the corresponding isolated intersection indicated by the numeral 9, then the tube 6 at that intersection is pressed by that object closer to the intersecting contact strip 5. The wire is thereby brought closer to the strip 5 and also, by the resulting flattening of the round tube 6 at that isolated point, the area of contact between the tube 6 and the strip 5 is increased. In these two ways, the resistance of the corresponding isolated path between the two conductors (the wires 7 and strip 5) is reduced.

Systematic electrical scanning of all the intersections shows which intersections are in contact with the object and this information can be displayed to give a visual indication of the shape of the contacted surface of the object, or can be compared with previously recorded data to identify one object among a variety of objects.

Figure 4:
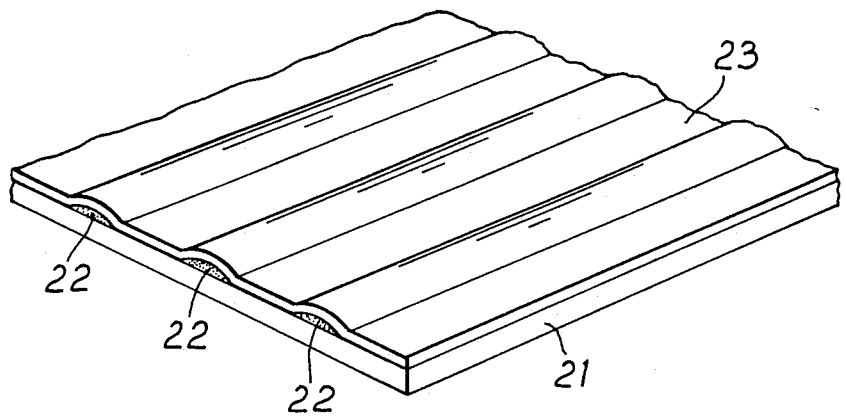
FIG. 4 is a fragmentary perspective view of a part of a second embodiment of the tactile sensor device according to the present invention.

The part, illustrated in FIG. 4, of the second embodiment of the tactile sensor device comprises a flexible layer 21 of a non-conductive rubber such as SILASTIC 734 RTV. Passing in parallel array across the surface of the layer 21 are strips 22 of a highly conductive rubber, loaded with carbon and, by way of example, having a resistivity of the order of less than 0.01 ohm-meters. In turn superimposed over the strips 22 is a layer 23 of a resilient piezoresistive material such as VITON. The resistivity of the piezoresistive material may, for example, be of the order of 10 ohm-meters. In one embodiment, the thicknesses of these superimposed layers of non-conductive, highly conductive and piezoresistive materials may typically be of the order of 0.5 mm, 0.4 mm and 0.2 mm respectively.

The part shown in FIG. 4 is illustrated, for clarity, with the piezoresistive layer 23 uppermost but may readily be manufactured upon the latter layer as its lowest layer. Thus, using a mould having a generally flat surface traversed with parallel round-bottomed channels, a thin layer of the piezoresistive material is applied across the whole of the mould surface, including the channels. Strips of the highly-conductive rubber are placed over the piezoresistive layer in the channels and the whole is then covered with a layer of the non-conductive rubber which is to form the layer 21. When the superimposed layers are removed from the mould, the assembly shown in FIG. 4 is obtained.

The assembled structure of FIG. 4 is placed upon a PCB resembling that used in the sensor of FIGS. 1 to 3, with the piezoresistive layer 23 in contact with the copper strips and with the rubber strips 22 running at right angles to the copper strips. The resulting tactile sensor device is shown, in section and to a somewhat larger scale, in FIG. 5, wherein the non-conducting substrate of the PCB is identified by the reference numeral 25 and the copper strips by the numeral 24.

Figure 5:
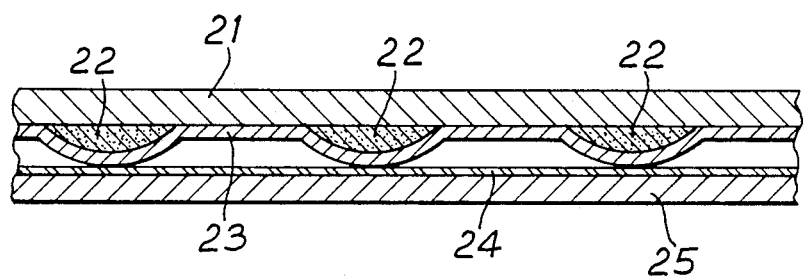
FIG. 5 is a sectional view of the second embodiment of the device, viewed in a direction corresponding to that of FIG. 2.

The sensor of FIGS. 4 and 5 works in a similar manner to that of FIGS. 1 to 3, with the layer 23 being selectively pressed and distorted at those isolated crossing points of the rubber strips 22 and copper strips 24 which are within the area of contact of the layer 21 with the object to be recognised.

The design of the device according to the present invention makes possible the construction of sensor pads of high spatial sensitivity. For example, the device illustrated in FIGS. 1 to 3 can be constructed with corresponding isolated intersections spaced at a 1 mm interval in two directions at right angles, allowing 32 tubes to intersect 32 contact strips and provide over one thousand isolated points of detection in an area of little more than 10 square cms. The device of FIGS. 4 and 5 is able to be constructed to obtain a resolution which may, for example, be four times that, incorporating as many as 64 high-conductivity rubber strips 22 and 64 copper strips 24.

I claim:

1. A tactile sensor device which comprises a first array of parallel elongated flat lengths of an electroconductive metallic material on a non-conductive substrate, and a second array comprising parallel elongated lengths of an electroconductive material, which lengths in said second array are overlaid by a resilient piezoresistive material forming a laterally distortable rounded covering for each said length, the two arrays being superimposed in an intersecting orientation with said rounded coverings being in contact with the flat lengths in said first array at corresponding isolated crossing points, such that the rounded coverings contact the flat lengths of the first array at the corresponding isolated crossing points to define individual independent detection points thereat spatially isolated from each other, and upon being subjected to local tactile compression the rounded coverings undergo lateral distortion independently at each corresponding individual detection point subjected to said compression and thereby reduce the distance between the lengths of the electroconductive material overlaid by the rounded coverings and the adjacent portion of the flat lengths of the first array thereat to reduce the resistance of the isolated path through the rounded coverings between the lengths of the electroconductive material overlaid thereby and the flat lengths of the first array at each such detection point subjected to said compression.

2. Device of claim 1 wherein the first array is in the form of a printed circuit board comprising narrow parallel strips of said electroconductive material on a non-conductive substrate.

3. A tactile sensor device which comprises a first array of parallel elongated flat lengths of an electroconductive metallic material on a non-conductive substrate, and a second array of parallel elongated lengths of an electroconductive material, said second array being disposed transverse to said first array whereby elongated lengths in the two arrays intersect at corresponding isolated crossing points, said second array being in the form of parallel wires of an electroconductive metal individually contained in laterally distortable round shaped tubes of resilient piezoresistive material, such that the round shaped tubes contact the flat lengths of the first array at the corresponding isolated crossing points to define individual independent detection points thereat spatially isolated from each other, and upon being subjected to local tactile compression the round tubes undergo lateral distortion independently at each corresponding individual detection point subjected to said compression and thereby reduce the distance between the wires contained therein and the adjacent portion of the flat lengths of the first array thereat to reduce the resistance of the isolated path through the tubes between the wires of the second array and the flat lengths of the first array at each such detection point subjected to said compression.

4. Device of claim 3 wherein said piezoresistive material is a silicone rubber.

5. A tactile sensor device which comprises
(a) a first array of parallel elongated flat lengths of an electroconductive metal on a non-conductive substrate, and
(b) a second array comprising parallel elongated lengths of an electroconductive material sandwiched between a generally flat sheet of a non-conductive material and a sheet of resilient piezoresistive material which overlies the lengths of said second array to form a laterally distortable rounded covering for each said length,
(c) said two arrays being superimposed with said piezoresistive material of said second array in contact with said electroconductive metal of said first array and with the elongated lengths of the respective two arrays intersecting each other at corresponding isolated crossing points.

6. Device of claim 5 wherein said electroconductive material of said second array, said non-conductive material of said second array and said piezoresistive material are all silicone rubbers of different resistivities.

7. Device of claim 5 wherein said elongated lengths of the respective two arrays intersect at right angles.

* * * * *